US010743060B2

(12) United States Patent
Utsumi et al.

(10) Patent No.: US 10,743,060 B2
(45) Date of Patent: Aug. 11, 2020

(54) INFORMATION PROCESSING APPARATUS, TELEVISION RECEIVER, INFORMATION PROCESSING SYSTEM, AND INFORMATION PROCESSING PROGRAM

(71) Applicant: Sony Corporation, Tokyo (JP)

(72) Inventors: Shusuke Utsumi, Tokyo (JP); Satoshi Suzuki, Tokyo (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 16/302,279

(22) PCT Filed: May 18, 2017

(86) PCT No.: PCT/JP2017/018646
§ 371 (c)(1),
(2) Date: Nov. 16, 2018

(87) PCT Pub. No.: WO2017/208839
PCT Pub. Date: Dec. 7, 2017

(65) Prior Publication Data
US 2019/0281344 A1 Sep. 12, 2019

(30) Foreign Application Priority Data

May 31, 2016 (JP) .................................. 2016-108917

(51) Int. Cl.
*H04N 21/431* (2011.01)
*H04N 21/478* (2011.01)
(Continued)

(52) U.S. Cl.
CPC ........... *H04N 21/4316* (2013.01); *H04N 5/45* (2013.01); *H04N 21/42207* (2013.01);
(Continued)

(58) Field of Classification Search
CPC ......... H04N 21/4316; H04N 21/42225; H04N 21/42207; H04N 21/4622; H04N 21/422
See application file for complete search history.

(56) References Cited

U.S. PATENT DOCUMENTS 7,783,595 B2 * 8/2010 Kim ........................ G06F 16/40
707/609
2002/0140861 A1 10/2002 Janevski et al.
(Continued)

FOREIGN PATENT DOCUMENTS

EP 2667628 A2 11/2013
FR 2902267 A1 12/2007
(Continued)

OTHER PUBLICATIONS

Anonymous: "HDMI (High-Definition Multimedia Interface)", Wikipedia the free encyclopedia, Nov. 12, 2012 (Nov. 12, 2012), XP055272974, Retrieved from the Internet: URL:https://en.wikipedia.org/w/index.php?title=HDMI&oldid=522640653 [retrieved on May 17, 2016], 24 pages.
(Continued)

*Primary Examiner* — Hsiungfei Peng
(74) *Attorney, Agent, or Firm* — Lerner, David, Littenberg, Krumholz & Mentlik, LLP

(57) ABSTRACT

This information processing apparatus, this information processing apparatus includes a data-sending interface capable of transmitting data to a television receiver through a first transmission channel; a request-sending interface capable of sending a request to the television receiver through a second transmission channel; a second interface connectable to the television receiver through the second transmission channel; and a first control unit that detects an event and performs control to send, to the television receiver through the second transmission channel, a request including at least control information for giving an instruction
(Continued)

about control to be executed by the television receiver in accordance with the detected event.

2 Claims, 10 Drawing Sheets

(51) Int. Cl.
    *H04N 21/436*    (2011.01)
    *H04N 21/422*    (2011.01)
    *H04N 21/462*    (2011.01)
    *H04N 5/45*      (2011.01)

(52) U.S. Cl.
    CPC ..... *H04N 21/42225* (2013.01); *H04N 21/431* (2013.01); *H04N 21/436* (2013.01); *H04N 21/4622* (2013.01); *H04N 21/4781* (2013.01)

(56) References Cited

U.S. PATENT DOCUMENTS

2009/0165042 A1    6/2009   Henry et al.
2010/0199308 A1*  8/2010   Hall .................... H04N 5/44543
                                             725/40
2011/0187928 A1    8/2011   Crabtree
2013/0246905 A1*  9/2013   Isozaki ............... G06F 17/2247
                                             715/234

FOREIGN PATENT DOCUMENTS

| | | |
|---|---|---|
| JP | 2003018460 A | 1/2003 |
| JP | 2013197861 A | 9/2013 |
| JP | 2016504644 A | 2/2016 |
| WO | 2013088481 A1 | 6/2013 |

OTHER PUBLICATIONS

Extended European Search Report for Application No. EP 17806397.0 dated Feb. 15, 2019.

International Search Report corresponding to PCT/JP2017/018646, dated Jul. 11, 2017, 3 pgs.

* cited by examiner

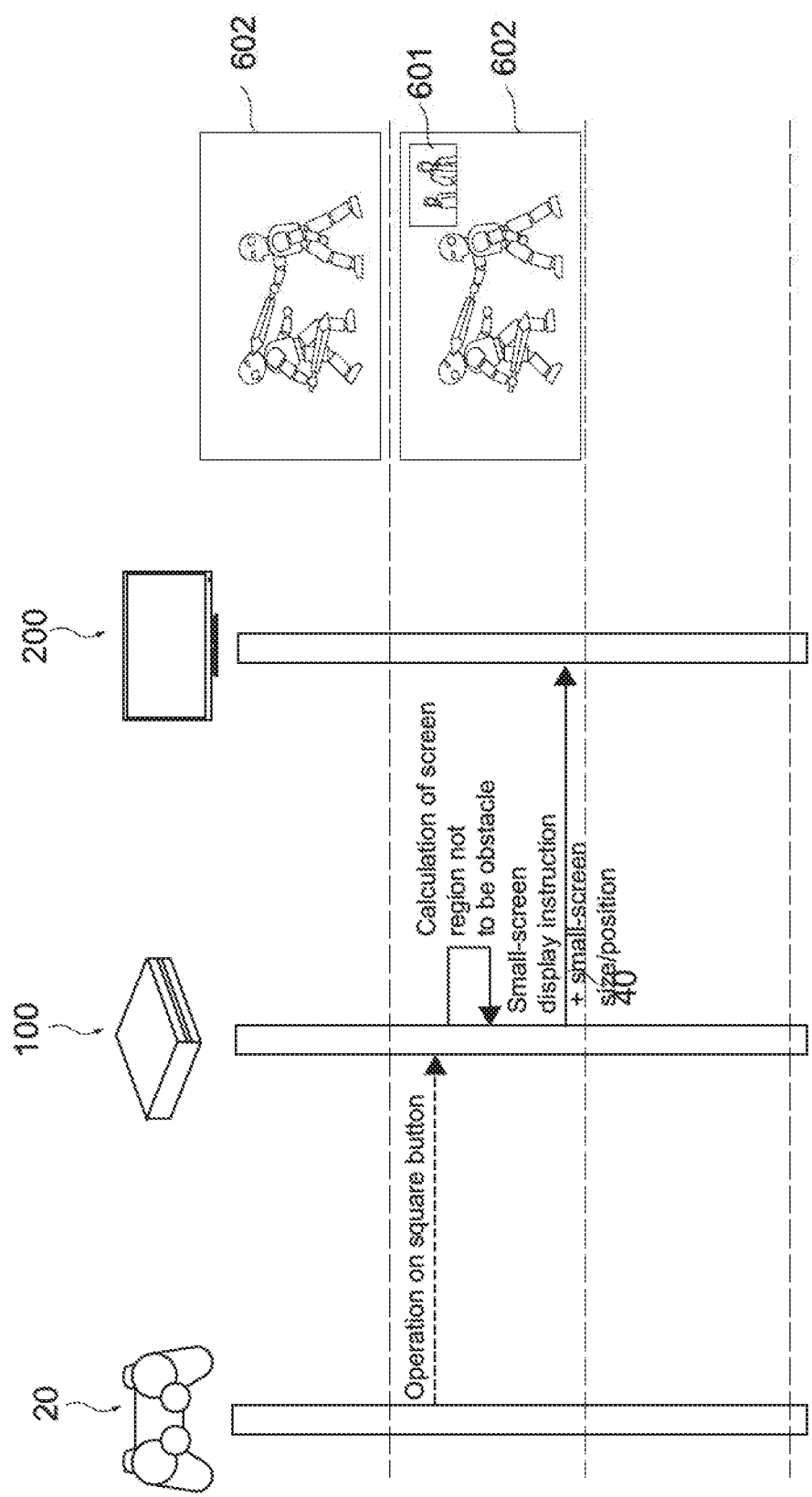

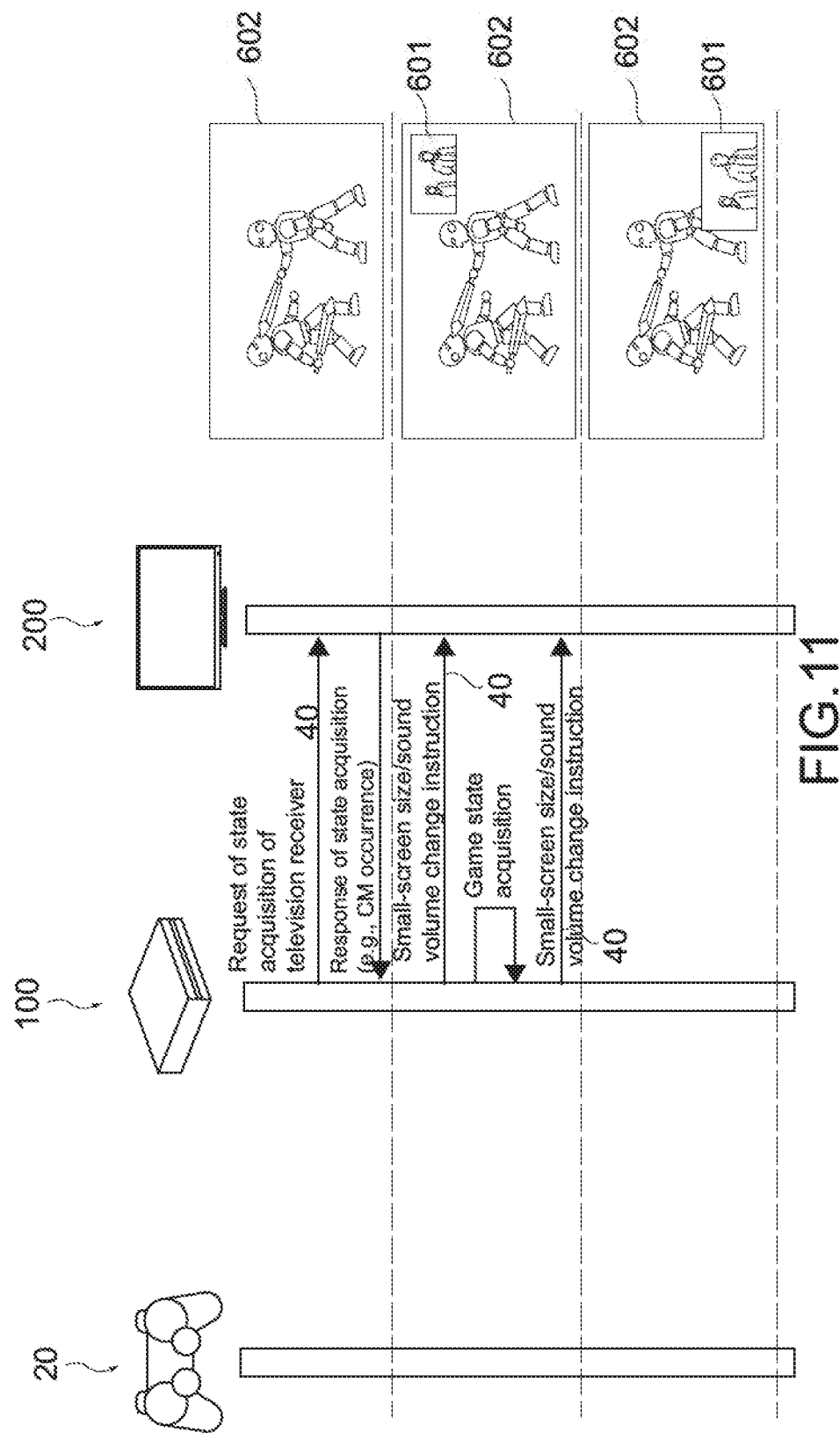

INFORMATION PROCESSING APPARATUS, TELEVISION RECEIVER, INFORMATION PROCESSING SYSTEM, AND INFORMATION PROCESSING PROGRAM

CROSS-REFERENCE TO RELATED APPLICATIONS

This application is a national phase entry under 35 U.S.C. § 371 of International Application No. PCT/JP2017/018646 filed May 18, 2017, which claims the priority from Japanese Patent Application No. 2016-108917 filed in the Japanese Patent Office on May 31, 2016, the entire contents of which are hereby incorporated by reference.

TECHNICAL FIELD

The present technology relates to an information processing apparatus such as a game console, a smartphone, a tablet terminal, and a personal computer, for example, a television receiver capable of connecting the information processing apparatus as a target apparatus for input switching, an information processing system, and an information processing program.

BACKGROUND ART

In an information processing apparatus capable of reproducing a plurality of kinds of electronic content including images, music, broadcasting, games, web pages, and the like by utilizing a screen of a television receiver, a game operation controller is basically used as a user's input apparatus. In order to allow a user to operate such a game operation controller to cause an information processing apparatus to execute desired information processing, the information processing apparatus is configured to output data of a screen for guiding the user to the desired processing, such as an operation menu screen, to a television receiver for displaying the data on a screen thereof (e.g., see Patent Literature 1).

Further, there is known a technology of receiving data through two input paths and displaying images obtained from that data on the television receiver in such a manner that the images overlap each other. In particular, in Patent Literature 2, an image of a broadcast program input through one of the input paths and a game image from a game console are combined and displayed on a single screen.

CITATION LIST

Patent Literature

Patent Literature 1: Japanese Unexamined Patent Application Publication No. 2016-504644
Patent Literature 2: Japanese Patent Application Laid-open No. 2003-018460 (paragraph 0046, FIG. 6)

DISCLOSURE OF INVENTION

Technical Problem

A system including an information processing apparatus, a television receiver capable of switching and selecting a processing result of this information processing apparatus as one of inputs, and a transmission channel that connects them will be referred to as an "information processing system" in the present specification. In such an information processing system, a data output of the information processing apparatus is merely one of data inputs through a plurality of paths which can be switched under the control of the television receiver in a one-sided manner. Various limitations and problems caused by this configuration have been pointed out. Thus, it is desirable to solve them.

It is an object of the present technology to provide an information processing apparatus, a television receiver, an information processing system, and an information processing program by which functional limitations of the information processing system in which the information processing apparatus and the television receiver are connected can be reduced and other problems can be solved.

Solution to Problem

In order to solve the above-mentioned object, an information processing apparatus of an embodiment of according to the present technology includes:

a data-sending interface capable of transmitting data to a television receiver through a first transmission channel;

a request-sending interface capable of sending a request to the television receiver through a second transmission channel; and a first control unit that detects an event and performs control to send, to the television receiver through the second transmission channel, a request including at least control information for giving an instruction about control to be executed by the television receiver in accordance with the detected event.

Advantageous Effects of Invention

As described above, in accordance with the present technology, functional limitations of the information processing system in which the information processing apparatus and the television receiver are connected can be reduced and other problems can be solved.

BRIEF DESCRIPTION OF DRAWINGS

FIG. 10 A diagram showing Operation Example 5 in the information processing system 1 of this embodiment.

FIG. 11 A diagram showing Operation Example 6 in the information processing system 1 of this embodiment.

MODE(S) FOR CARRYING OUT THE INVENTION

Hereinafter, embodiments according to the present technology will be described with reference to the drawings.

First Embodiment (Configuration of Information Processing System)

Figure 1:
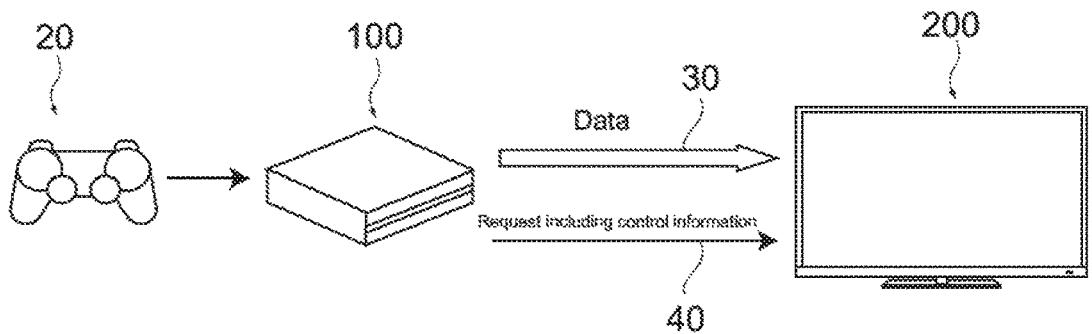
FIG. 1 A block diagram showing a configuration of an information processing system 1 of a first embodiment according to the present technology.

FIG. 1 is a block diagram showing a configuration of an information processing system 1 of a first embodiment.

The information processing system 1 of this embodiment mainly includes an information processing apparatus 100, a television receiver 200, and two transmission channels 30 and 40 that connect the information processing apparatus 100 and the television receiver 200.

The information processing apparatus 100 may be, for example, a game console, a smartphone, a tablet terminal, a personal computer, or the like. In this embodiment, the television receiver 200 is an apparatus capable of receiving and reproducing television broadcasting and capable of receiving and displaying data such as multimedia data transmitted from the information processing apparatus 100 through the one transmission channel 30.

For one transmission channel 30 of the two transmission channels 30 and 40 that connect the information processing apparatus 100 and the television receiver 200, a multimedia interface such as a high-definition multimedia interface (HDMI) (registered trademark) is typically used. Hereinafter, this transmission channel will be referred to as a "first transmission channel". Multimedia data such as image data and audio data is transmitted from the information processing apparatus 100 to the television receiver 200 through this first transmission channel 30.

For the other transmission channel 40 that connects the information processing apparatus 100 and the television receiver 200, a communication interface such as a network interface, for example, is used. Hereinafter, this transmission channel will be referred to as a "second transmission channel 40". A request including at least control information for giving an instruction about control to be executed by a CPU of the television receiver 200 is sent from the information processing apparatus 100 to the television receiver 200 and a response to the request is sent from the television receiver 200 to the information processing apparatus 100 through this second transmission channel 40.

(Hardware Configuration of Information Processing Apparatus 100)

Figure 2:
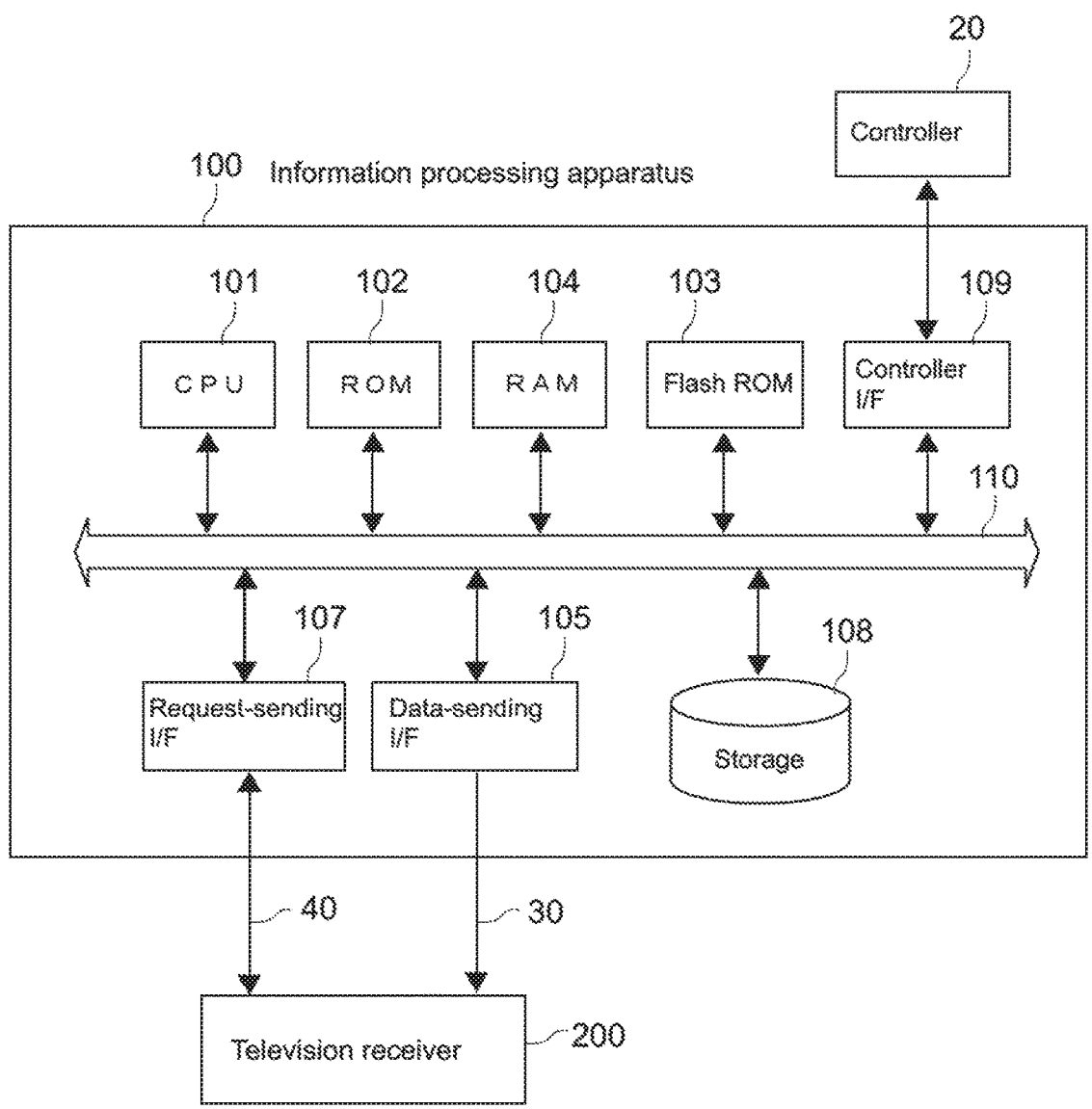
FIG. 2 A block diagram showing a hardware configuration of an information processing apparatus 100 in FIG. 1.

FIG. 2 is a block diagram showing a hardware configuration of the information processing apparatus 100.

As shown in the figure, the information processing apparatus 100 includes a CPU (first control unit) 101, a ROM 102, a flash ROM 103, a RAM 104, a data-sending interface 105, a request-sending interface 107, storage 108, a controller interface 109, a system bus 110, and the like.

The central processing unit (CPU) 101 performs arithmetic processing for controlling the information processing apparatus 100 by executing, for example, an operating system and a program such as an application program which are stored in the ROM 102, the flash ROM 103, the RAM 104, and the like.

The ROM 102 (read only memory) is a memory in which programs, data, and the like for controlling each hardware module of the information processing apparatus 100 are fixedly stored.

The flash ROM 103 is a memory used as part of external storage of the information processing apparatus 100.

The RAM 104 (random access memory) is a memory in which programs and the like to be interpreted and executed by the CPU 101 are retained and which provides a working area for the arithmetic processing of the CPU 101.

The data-sending interface 105 is a transmission processing device that sends multimedia data such as image data, audio data, and the like of a game, for example, from the information processing apparatus 100 to the television receiver 200 through the first transmission channel 30.

The request-sending interface 107 is a communication processing device that sends a request to the television receiver 200 through the second transmission channel 40 and receives a response from the television receiver 200.

In the storage 108, there are stored programs and data to be used for the information processing to be executed at the information processing apparatus 100 and further various types of data and the like to be transmitted from the information processing apparatus 100 to the television receiver 200.

The controller interface 109 is an interface to a controller (input apparatus) 20 for operating this information processing apparatus 100. The controller interface 109 communicates with the controller 20 by using light, radio waves, or the like as a communication medium.

The system bus 110 is a transmission channel for connecting the CPU 101 and the above-mentioned respective units.

Figure 3:
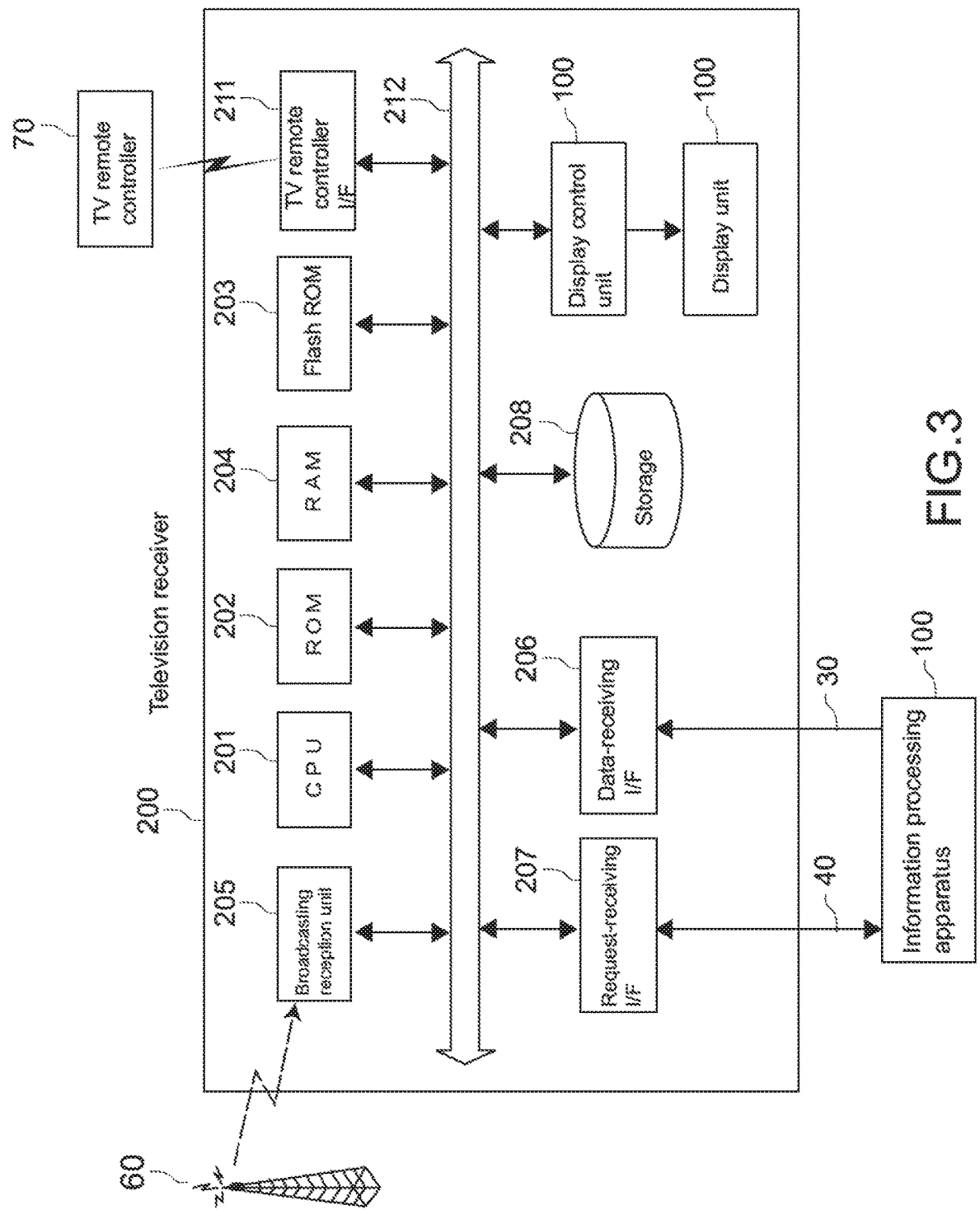
FIG. 3 A block diagram showing a hardware configuration of a television receiver 200 in FIG. 1.

FIG. 3 is a block diagram showing a hardware configuration of the television receiver 200.

As shown in the figure, the television receiver 200 includes a CPU 201 (second CPU), a ROM 202, a flash ROM 203, a RAM 204, a broadcasting reception unit 205, a data-receiving interface 206, a request-receiving interface 207, storage 208, a display control unit 209, a display unit 210, a TV remote controller interface 211, a system bus 212, and the like.

The CPU 201 performs arithmetic processing for controlling the television receiver 200 by executing, for example, an operating system and a program such as an application program which are stored in the ROM 202, the flash ROM 203, the RAM 204, and the like.

The ROM 202 is a memory in which programs, data, and the like for controlling each hardware module of the television receiver 200 are fixedly stored.

The flash ROM 203 is a memory used as part of external storage of the television receiver 200.

The RAM 204 is a memory in which programs and the like to be interpreted and executed by the CPU 201 are retained and which provides a working area for the arithmetic processing of the CPU 201.

The broadcasting reception unit 205 receives waves of broadcasting, for example, digital terrestrial television broadcasting, CS digital broadcasting, BS digital broadcasting, digital terrestrial television broadcasting for mobile devices, or the like, from a broadcast station 60 and performs demodulation and the like on video signals and audio signals.

The data-receiving interface 206 is a transmission processing device that receives multimedia data such as image data, audio data, and the like of a game, for example, which are transmitted from the information processing apparatus 100 through the first transmission channel 30.

Note that this television receiver 200 may include a plurality of similar data-receiving interfaces 206. An apparatus that transmits data such as multimedia data and the like, for example, a recording apparatus, a medium reproduction apparatus, or the like, other than the information processing apparatus 100 can be connected to each of the data-receiving interfaces 206. Each piece of data to be transmitted from the apparatus connected to each of the plurality of data-receiving interfaces 206 and the television broadcasting received by the broadcasting reception unit 205 are switched by the CPU 201 on the basis of, for example, input switching information given by a user operating a TV remote controller 70.

The request-receiving interface 207 is a communication processing device that receives a request sent from the information processing apparatus 100 through the second transmission channel 40 and sends a response from the information processing apparatus 100 through the second transmission channel 40.

The storage 108 is used as a data storage area or the like for recording television broadcasting and the like, for example.

The display control unit 209 controls the display unit 210 to display the television broadcasting received by the broadcasting reception unit 205 and the data and the like transmitted by an external apparatus such as the information processing apparatus 100 and the like.

The display unit 210 is a display device, for example, a liquid crystal display (LCD), an organic light-emitting diode (OLED) display, or the like that visualizes and outputs display information supplied from the display control unit 209.

The TV remote controller interface 211 is an interface to the TV remote controller 70 that remotely operates the television receiver 200. The TV remote controller interface 211 communicates with the TV remote controller 70 by using light, radio waves, or the like as a communication medium.

The system bus 212 is a transmission channel for connecting the CPU 201 and the above-mentioned respective units.

Note that, although not shown in the drawings, the television receiver 200 also has a function of outputting, as audio, the audio data obtained by demodulating and decoding the broadcasting signals received by the broadcasting reception unit 205 and the audio data transmitted from the external apparatus such as the information processing apparatus 100.

(Generation of Request in Information Processing Apparatus 100)

In the information processing system 1 of this embodiment, the CPU 101 of the information processing apparatus 100 is configured to detect an event and send, to the television receiver 200 through the second transmission channel 40, a request including at least control information for giving an instruction about control to be executed by the television receiver 200 in accordance with the detected event. Further, the CPU 201 of the television receiver 200 is configured to perform internal control of the television receiver 200 in accordance with the control information included in the request received from the information processing apparatus 100 through the second transmission channel 40.

First of all, functions of the CPU 101 of the information processing apparatus 100 will be described.

Figure 4:
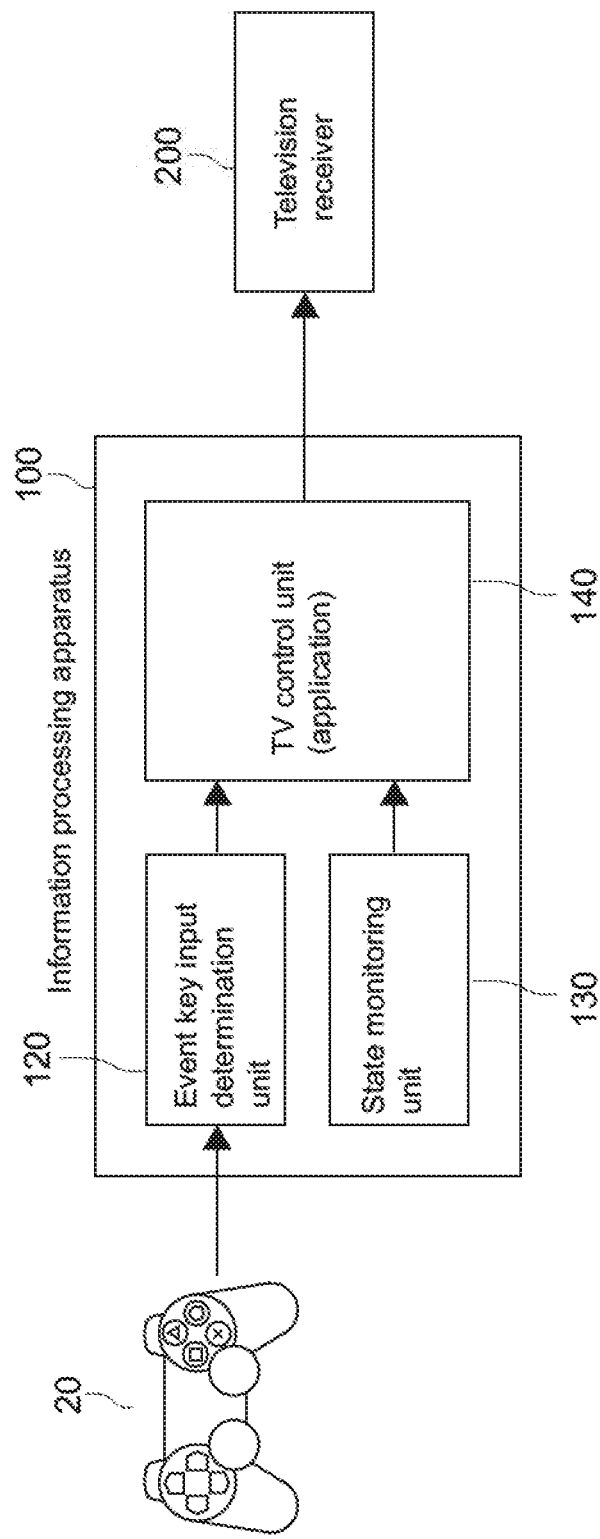
FIG. 4 A diagram showing functions of a CPU 101 of the information processing apparatus 100 in FIG. 2 as blocks.

FIG. 4 is a diagram showing the functions of the CPU 101 of the information processing apparatus 100 as blocks.

As shown in the figure, the CPU 101 of the information processing apparatus 100 operates as an event key input determination unit 120 and a state monitoring unit 130 and also operates as a TV control unit 140 in accordance with a TV control application.

The event key input determination unit 120 detects a predetermined key operation of the controller 20 as an event and notifies the TV control unit 140 of the event information.

The state monitoring unit 130 detects that a predetermined state has occurred in the information processing apparatus 100 as an event and notifies the TV control unit 140 of the detected event information. More specifically, in a case where the information processing apparatus 100 is, for example, a game console, the state monitoring unit 130 monitors a play state of a game, a download state of program data of a new game, uploaded data thereof, and the like (waiting time, downloaded/remaining volume ratio, download completion, and the like), a log-in state of a friend who is another user playing an on-line game together, and the like and notifies the TV control unit 140 of an event corresponding to those states.

The TV control unit 140 is configured by a TV control application program. The TV control application program is installed in the information processing apparatus 100 in order to enable the information processing apparatus 100 to control the television receiver 200. The TV control unit 140 generates a request including at least control information for giving an instruction about control to be executed by the television receiver 200 in accordance with a kind of event information notified by the event key input determination unit 120 and the state monitoring unit 130, and performs control to send it to the television receiver 200 through the second transmission channel 40. Note that, in a manner that depends on kinds of event information, the request sent to the television receiver 200 includes data to be displayed on the television receiver 200 and information about a display position, a display size, and the like of that data.

Next, functions of the CPU 201 of the television receiver 200 will be described.

Figure 5:
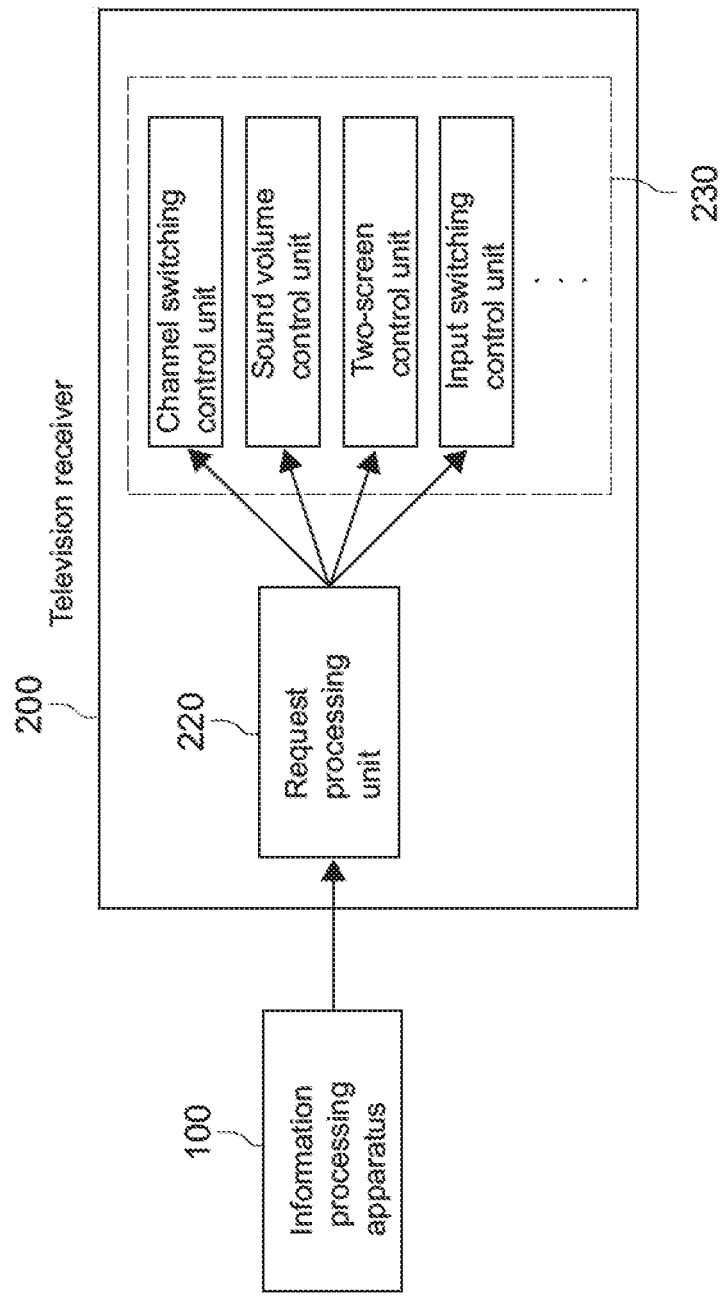
FIG. 5 A diagram showing functions of a CPU 201 of the television receiver 200 of FIG. 3 as blocks.

FIG. 5 is a diagram showing the functions of the CPU 201 of the television receiver 200 as blocks.

As shown in the figure, the CPU 201 of the television receiver 200 operates as a request processing unit 220 and a plurality of internal control units 230. The internal control units 230 include a plurality of control executing units corresponding to user's operations and include, for example, a control unit that performs channel switching, a control unit that performs sound volume control, a control unit that performs control for two-screen display, a control unit that controls input switching, and the like. The request processing unit 220 receives a request sent from the information processing apparatus 100 through the second transmission channel 40 and instructs the one or more internal control units 230, which serve to perform control about which an instruction has been given with control information included in that request, to execute the control.

The request processing unit 220 can be configured by using a web application program interface (Web API), Socket, and the like, for example.

[Operation of Information Processing System 1]

Next, an operation example in a case of controlling the television receiver 200 from the information processing apparatus 100 in the information processing system 1 of this embodiment will be described.

Operation Example 1

Figure 6:
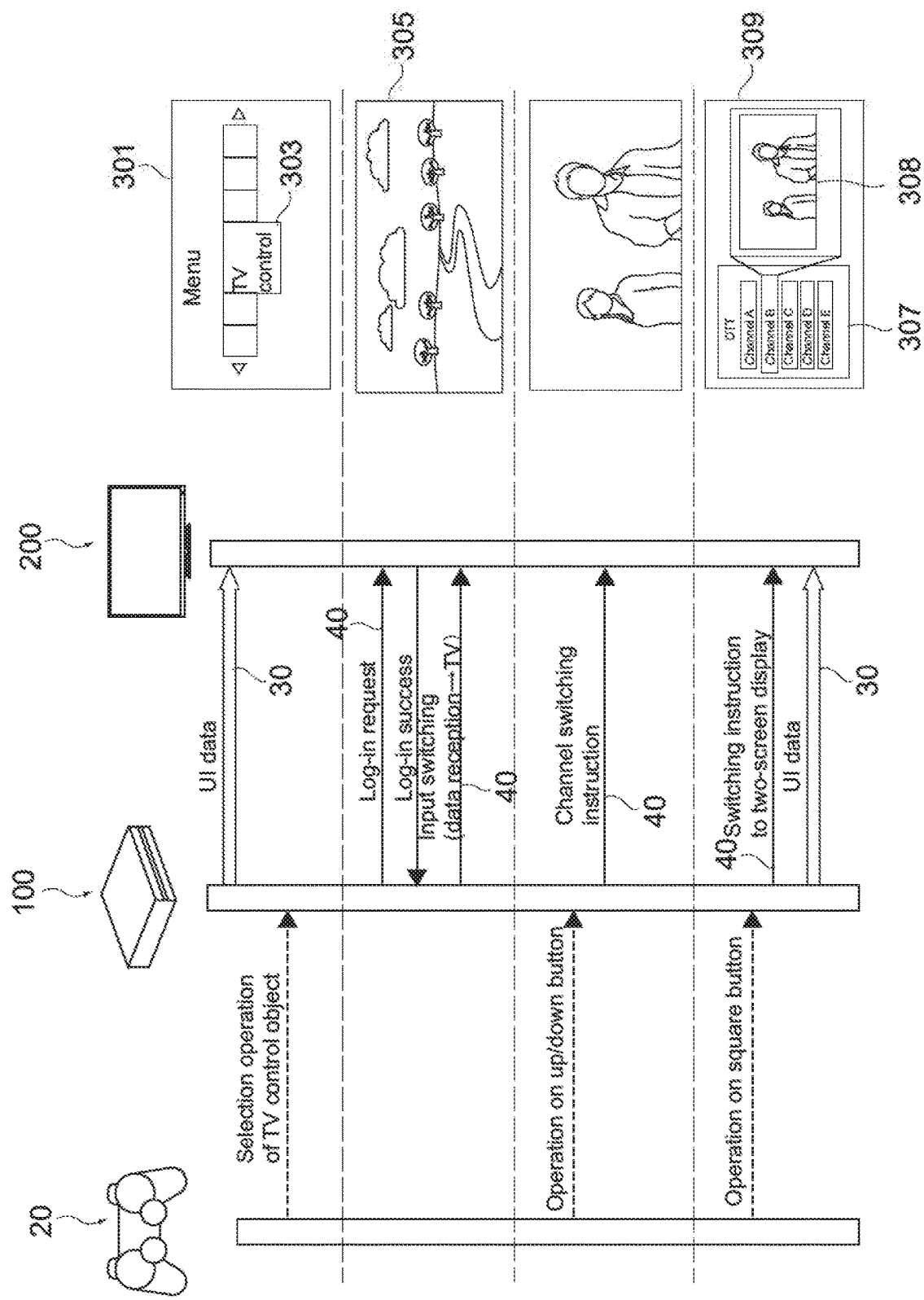
FIG. 6 A diagram showing Operation Example 1 in the information processing system 1 of this embodiment.

FIG. 6 is a diagram showing Operation Example 1 in the information processing system 1 of this embodiment.

The user selects the data-receiving interface 206, to which the information processing apparatus 100 is connected, as an input of the television receiver 200 by using the TV remote controller 70. In this manner, data of a user interface 301 of the information processing apparatus 100, such as home screen data and menu screen data, is transmitted to the television receiver 200 from the information processing apparatus 100 through the first transmission channel 30, and is displayed on the display unit 210 of the television receiver 200. The user interface 301 displayed at this time includes a TV control selection object 303 for receiving selection to activate the TV control unit 140 for controlling the television receiver 200 from the information processing apparatus 100 and the like.

When the user selects the TV control selection object 303 on the user interface 301 displayed on the display unit 210 of the television receiver 200 by using the controller 20 of the information processing apparatus 100, the CPU 101 of the information processing apparatus 100 activates the TV control unit 140.

The CPU 101 operates in the following manner by using the activated TV control unit 140.

First of all, the CPU 101 sends, to the television receiver 200 through the second transmission channel 40, a log-in request including its own authentication information (of the information processing apparatus 100). When receiving a response of log-in success from the television receiver 200, the CPU 101 of the information processing apparatus 100 performs control to send, to the television receiver 200 through the second transmission channel 40, a request including control information for giving an instruction to switch the input of the television receiver 200 from the data-receiving interface 206, to which the information processing apparatus 100 is connected, to the television broadcasting.

On the other hand, in accordance with the control information included in the request received through the second transmission channel 40, the CPU 201 of the television receiver 200 performs control to switch the input of the television receiver 200 from the data-receiving interface 206, to which the information processing apparatus 100 is connected, to the television broadcasting. Accordingly, the display of the display unit 210 is switched from the user interface 301 provided from the information processing apparatus 100 to television broadcasting 305 of a latest channel selected at the television receiver 200, for example.

After that, for switching a reception channel of the television broadcasting, for example, the user only needs to operate, for example, an up/down button and the like of the controller 20 of the information processing apparatus 100. The CPU 101 of the information processing apparatus 100 detects an operation on the up/down button and the like of the controller 20, generates a request including control information for instructing the television receiver 200 to switch the reception channel, and sends this request to the television receiver 200 through the second transmission channel 40.

The CPU 201 of the television receiver 200 performs control to switch the reception channel of the television receiver 200 in accordance with the control information included in the request received through the second transmission channel 40.

Otherwise, also when the user operates a button to which, for example, another function of input switching, sound volume change, or the like of the television receiver 200 is assigned on the controller 20 of the information processing apparatus 100, a request including control information for instructing the television receiver 200 to execute the control assigned to that operation is similarly sent from the information processing apparatus 100 to the television receiver 200 through the second transmission channel 40, and that control is executed by the CPU 201 of the television receiver 200.

As described above, the information processing system 1 of this embodiment is configured such that the request including the control information for giving the instruction about the control to be executed by the television receiver 200 is sent from the information processing apparatus 100 to the television receiver 200 through the second transmission channel 40 in accordance with the operation of the controller 20 of the information processing apparatus 100, and the television receiver 200 executes the control in accordance with the control information included in this request. With this configuration, it is possible to control the television receiver 200 with a high degree of freedom in accordance with the operation of the controller 20 of the information processing apparatus 100.

Next, a case where the user operates a button (e.g., a square button or the like) for two-screen display on the controller 20 of the information processing apparatus 100 will be described.

When detecting an operation on the square button for two-screen display of the controller 20, the CPU 101 of the information processing apparatus 100 sends data to be displayed on one screen of that two-screen display to the television receiver 200 from the information processing apparatus 100 through the first transmission channel 30. Further, the CPU 101 of the information processing apparatus 100 generates a request including control information for giving an instruction to combine and display the data sent from the information processing apparatus 100 through the first transmission channel 30 and the data currently selected by input switching control at the television receiver 200 as the two-screen display, and performs control to send this request to the television receiver 200 through the second transmission channel 40.

Note that the data transmitted by the information processing apparatus 100 to the television receiver 200 through the first transmission channel 30 at this time may be an operation guide indicating how to operate the television receiver 200 by using the controller 20 of the information processing apparatus 100 other than the user interface operated by using the controller 20 of the information processing apparatus 100 or the like. Specifically, the operation guide is data of text, an image, and the like for guiding the user as to how to perform various operations, for example, channel switching, input switching, sound volume change, two-screen display, maximization of a selected screen (full-screen display), minimization of a selected screen, and the like, by using the controller 20 of the information processing apparatus 100.

When receiving the request through the second transmission channel 40, in accordance with the control information included in this request, the CPU 201 of the television receiver 200 performs control to combine and display data 307 transmitted to the television receiver 200 from the information processing apparatus 100 through the first transmission channel 30 and data 308 currently selected by input switching control at the television receiver 200 on a two-screen display mode 309.

As described above, in the information processing system 1 of this embodiment, the CPU 101 of the information processing apparatus 100 transmits the data 307 to be displayed on the one screen of the two-screen display to the television receiver 200 through the first transmission channel 30, and the CPU 201 of the television receiver 200 combines and displays, in accordance with the control information included in the request sent from the information processing apparatus 100 through the second transmission channel 40, the data 307 transmitted from the information processing apparatus 100 and the data 309 currently selected by input switching control at the television receiver 200 on the two-screen display mode 309. With this configuration, it is possible to cause the television receiver 200 to display the data 307 of the user interface to be operated by using the controller 20 of the information processing apparatus 100, the operation guide, and the like at all times in accordance with the operation of the controller 20 of the information processing apparatus 100.

In this regard, the function of combining and displaying the user interface and the television broadcasting can be realized also in a typical system configuration in which the information processing apparatus 100 and the television receiver 200 are connected only through an HDMI (registered trademark) interface. However, in this typical example, the CPU 101 of the information processing apparatus 100 transmits the combined data of the user interface and the data of the television broadcasting to the television receiver 200 through the HDMI (registered trademark) interface for displaying it. In this case, the data transmitted from the information processing apparatus 100 to the television receiver 200 is merely an input to be an input switching target for the television receiver 200. Thus, if input switching to other data occurs in accordance with an operation of the TV remote controller 70 of the television receiver 200, the operation environment of the user interface cannot be used. For displaying the input again, the TV remote controller 70 of the television receiver 200 should be operated.

In accordance with the information processing system 1 of this embodiment, in a case where two screens for the data 307 transmitted to the television receiver 200 from the information processing apparatus 100 through the first transmission channel 30 and the data 308 currently selected by input switching control at the television receiver 200 are displayed, also if only the television broadcasting is displayed by performing an input switching operation to the television broadcasting by using the TV remote controller 70 of the television receiver 200, the two screens can be displayed again by operating a button for re-displaying the two screens on the controller 20 of the information processing apparatus 100.

Operation Example 2

Figure 7:
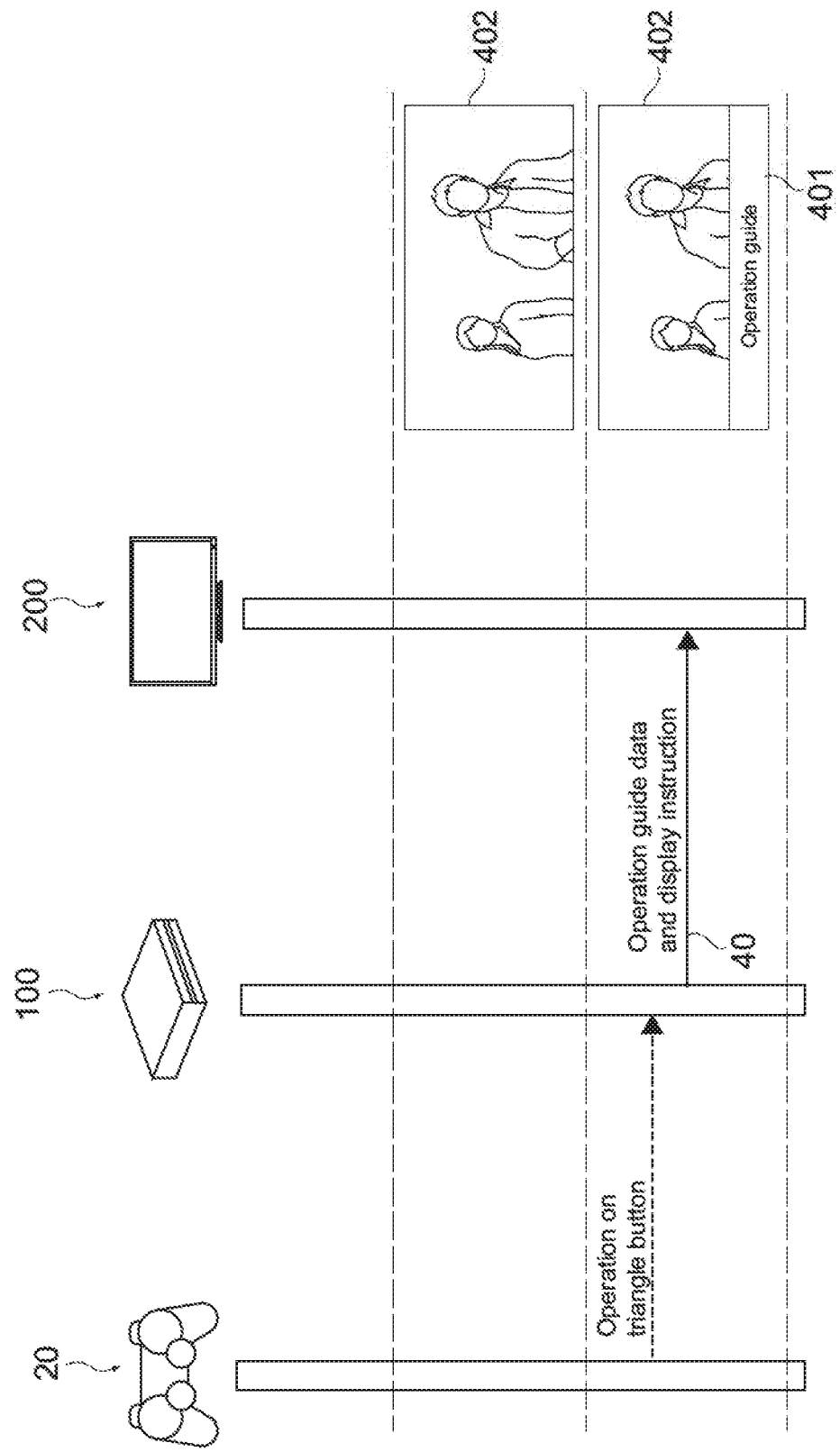
FIG. 7 A diagram showing Operation Example 2 in the information processing system 1 of this embodiment.

FIG. 7 is a diagram showing Operation Example 2 in the information processing system 1 of this embodiment.

This Operation Example 2 is an operation in a case of sending, from the information processing apparatus 100 to the television receiver 200 through the second transmission channel 40, data and a request including control information for giving an instruction to display this data in such a manner that this data is superimposed on the data currently selected by input switching control at the television receiver 200.

It is assumed that the user has operated a triangle button or the like of the controller 20 of the information processing apparatus 100, for example. In this case, the CPU 101 of the information processing apparatus 100 generates data and a request including control information for giving an instruction to display this data in such a manner that this data is superimposed on the data currently selected by input switching control at the television receiver 200, and performs control to send this request to the television receiver 200 through the second transmission channel 40. That is, Operation Example 2 is different from Operation Example 1 in that the data is transmitted to the television receiver 200 through the second transmission channel 40, not through the first transmission channel 30.

In accordance with the control information included in that request received through the second transmission channel 40, the CPU 201 of the television receiver 200 performs control to display data 401 included in this request in such a manner that the data 401 is superimposed on data 402 currently selected by input switching control at the television receiver 200.

Here, the data 401 displayed superimposed on the data 402 currently selected by input switching control at the television receiver 200 may be, for example, data of the user interface to be operated by using the controller 20 of the information processing apparatus 100, the operation guide, and the like as in Operation Example 1.

With this configuration, for example, when viewing the data currently selected by input switching control at the television receiver 200, for example, the television broadcasting, the other data 402, or the like externally transmitted, the user can operate the television receiver 200 by using the controller 20 of the information processing apparatus 100 while checking the data 401 of the operation guide and the like displayed superimposed on that data 402.

Operation Example 3

Figure 8:
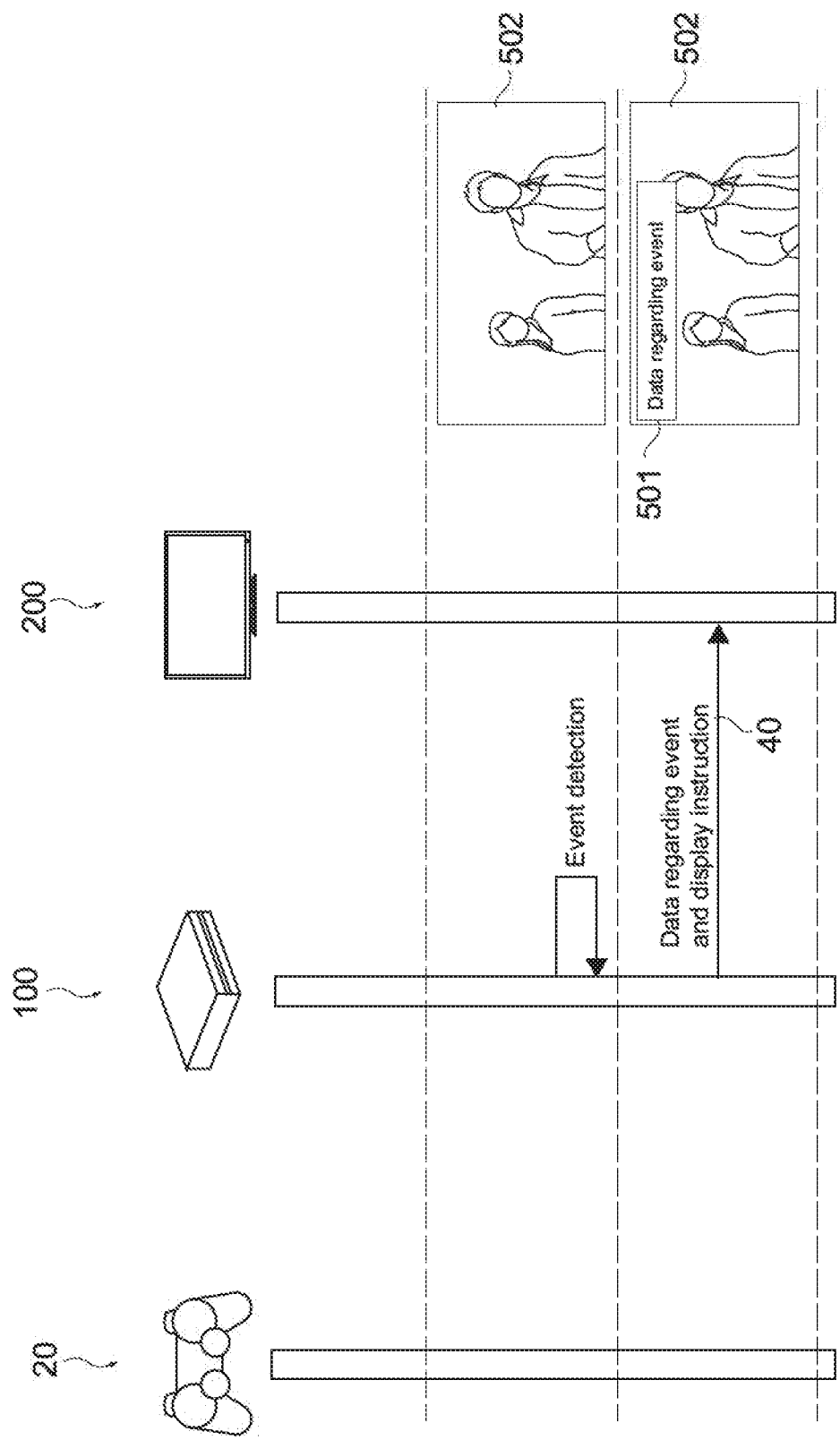
FIG. 8 A diagram showing Operation Example 3 in the information processing system 1 of this embodiment.

FIG. 8 is a diagram showing Operation Example 3 in the information processing system 1 of this embodiment.

This Operation Example 3 is an operation in a case of detecting that a predetermined state has occurred in the information processing apparatus 100 as an event by the CPU 101 and sending, from the information processing apparatus 100 to the television receiver 200 through the second transmission channel 40, data regarding that event and a request including control information for giving an instruction to display this data in such a manner that this data is superimposed on the data currently selected by input switching control at the television receiver 200.

The CPU 101 of the information processing apparatus 100 monitors the state in the information processing apparatus 100 and detects that the predetermined state has occurred as the event. When detecting the event, the CPU 101 of the information processing apparatus 100 generates the data regarding the detected event and a request including control information for giving an instruction to display this data in such a manner that this data is superimposed on the data currently selected by input switching control at the television receiver 200, and performs control to send this request to the television receiver 200 through the second transmission channel 40.

in accordance with the control information included in that request received through the second transmission channel 40, the CPU 201 of the television receiver 200 performs control to display data 501 regarding the event included in this request in such a manner that the data 501 is superimposed on data 502 of the television broadcasting and the like currently displayed on the television receiver 200.

Here, the data 501 regarding the event displayed superimposed on the data 502 of the television broadcasting is information for presenting the contents of that event to the user. Specifically, the data regarding the event is a play state of a game, a download state of program data of a new game, uploaded data thereof, and the like (waiting time, downloaded/remaining volume ratio, download completion, and the like), an install state of the program, and a friend state such as log-in/log-out and the number of log-in times of a friend who is another user playing an on-line game together, and the like. With this configuration, the user can recognize, from the display unit 210 of the television receiver 200, the above-mentioned various events which occur while the user is viewing the television broadcasting or the data transmitted from the external apparatus, for example.

For example, in a case where the displayed data regarding the event is install completion of program data of a new game, the user can recognize, from the display of the data regarding that event, that the user can start to play the new game. Similarly, on the basis of the data regarding the event displayed as to the friend state, the user can decide whether or not to start the on-line game. That is, the user can wait until an expected condition occurs while viewing the television broadcasting or the data transmitted from the external apparatus.

Operation Example 4

Figure 9:
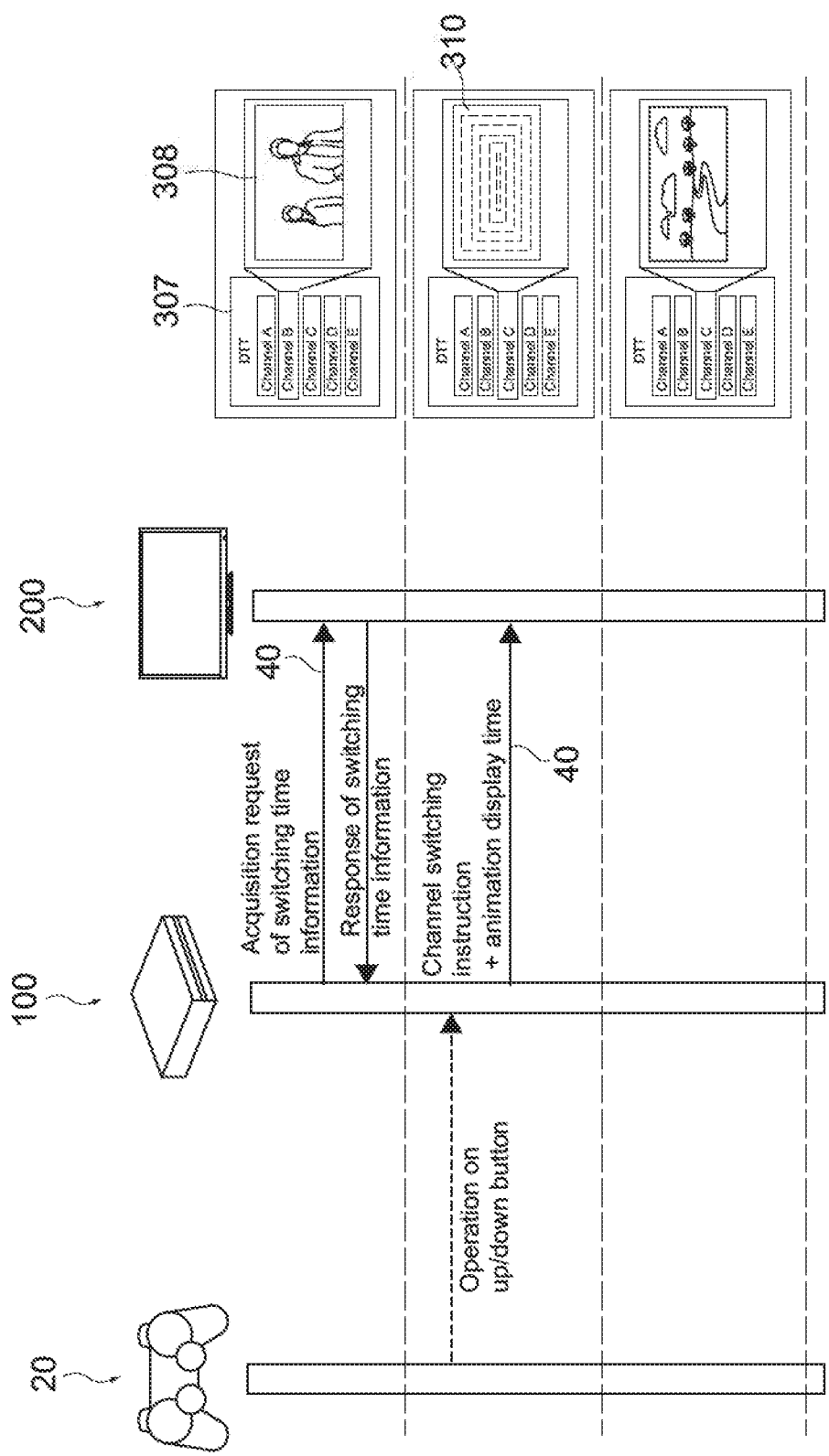
FIG. 9 A diagram showing Operation Example 4 in the information processing system 1 of this embodiment.

FIG. 9 is a diagram showing Operation Example 4 in the information processing system 1 of this embodiment.

In Operation Example 4, the CPU 101 of the information processing apparatus 100 performs a request to acquire switching time information of time required for channel switching from the television receiver 200, to thereby acquire and save the information about the channel switching time. The time required for channel switching is time required for a channel of the television broadcasting to be switched on the display in the television receiver 200. This time mainly depends on specifications of the television receiver 200. Note that the processing of acquiring the information about the channel switching time only needs to be performed, for example, every time the TV control unit 140 in the information processing apparatus 100 is activated or every time a new television receiver 200 is connected.

Now, it is assumed that the two screens of the data 307 of the user interface transmitted from the information processing apparatus 100 through the first transmission channel 30 and the data 308 currently selected by input switching control at the television receiver 200 are displayed on the television receiver 200.

When the user performs an operation to give an instruction to switch the reception channel, for example, an operation on the up/down button of the controller 20 of the information processing apparatus 100 or the like, the CPU 101 of the information processing apparatus 100 gives an instruction to switch the channel and generates a request including at least control information for displaying a predetermined animation in a screen region to which display of the television broadcasting is assigned while switching of the channel is executed in the television receiver 200. At this time, the CPU 101 of the information processing apparatus 100 calculates optimal animation display time on the basis of the saved information about the channel switching time and generates the control information. Then, the CPU 101 of the information processing apparatus 100 sends the generated request to the television receiver 200 through the second transmission channel 40.

When receiving the request through the second transmission channel 40, in accordance with the control information included in this request, the CPU 201 of the television receiver 200 executes switching of the channel and animation display 310 while this switching of the channel is executed.

With this configuration, the effect that the animation display makes the user feel as if the waiting time until the channel is switched in the television receiver 200 is reduced can be expected.

Operation Example 5

FIG. 10 is a diagram showing Operation Example 5 in the information processing system 1 of this embodiment.

Operation Example 5 is an operation example in a case where the user operates the square button for two-screen display on the controller 20 of the information processing apparatus 100 when game data transmitted from the information processing apparatus 100 through the first transmission channel 30 is selected and displayed by input switching control at the television receiver 200.

When detecting an operation on that square button for two-screen display of the remote controller, the CPU 101 of the information processing apparatus 100 calculates a position and a size of a small screen 601 to be displayed together with a game screen 602 on the screen of the television receiver 200. Here, data other than the data from the information processing apparatus 100, such as data of the television broadcasting whose channel is currently selected in the television receiver 200, is displayed on the small screen 601. For calculating the position and the size of the small screen 601, the CPU 101 of the information processing apparatus 100 calculates a region most unlikely to be spatially an obstacle when playing the game and sets the small screen 601 in this region.

Specifically, the region most unlikely to be spatially an obstacle when playing the game is a region having least influence on the play or the like such as a region including only a background image of the game. In many cases, such a region exists other than the center portion of the screen, and thus the CPU 101 of the information processing apparatus 100 may uniquely set the small screen 601 in the region other than the center portion of the screen. Alternatively, the CPU 101 may acquire information about the region having least influence on the play from the game program and calculate the position and the size of the small screen 601. Alternatively, the position of the small screen 601 may be selectable by the user as appropriate.

Operation Example 6

FIG. 11 is a diagram showing Operation Example 6 in the information processing system 1 of this embodiment.

Operation Example 6 is an operation example of changing the size and the sound volume of the small screen 601 of the television broadcasting currently displayed on the television receiver 200 in accordance with the states of the information processing apparatus 100 and the television receiver 200, for example, subsequently to Operation Example 5.

The CPU 101 of the information processing apparatus 100 sends, to the television receiver 200 through the second transmission channel 40, a request for acquiring the state of the television receiver 200. In response to this request, when a particular state occurs, the CPU 201 of the television receiver 200 sends information regarding that state back to the information processing apparatus 100 through the second transmission channel 40. For example, when a commercial or the like is broadcasted, the CPU 201 of the television receiver 200 sends information regarding this state back to the information processing apparatus 100. Otherwise, on the basis of preference information set in advance by the user to the television receiver 200, it is also possible to send information indicating that a scene preferred by the user is broadcasted back to the information processing apparatus 100.

On the basis of information regarding the state sent back from the television receiver 200, the CPU 101 of the information processing apparatus 100 acquires a request including control information for giving an instruction to change the size or the sound volume or both of the small screen 601 currently displayed to the television receiver 200 through the second transmission channel 40. For example, during the commercial time, the CPU 101 performs control to reduce the size of the small screen 601 and reduce the sound volume of the television broadcasting. Alternatively, when the scene preferred by the user is broadcasted, the CPU 101 performs control to increase the size of the small screen 601 and increase the sound volume of the television broadcasting.

Further, the CPU 101 of the information processing apparatus 100 may monitor a state of a currently played game and send, through the television receiver 200, a request including control information for giving an instruction to increase the size of the small screen 601 and increase the sound volume of the television broadcasting during a period not to interfere with the game, for example, during download time of a game program or the like.

Modified Example

In the above-mentioned embodiments, the first transmission channel 30 using the multimedia interface such as the HDMI (registered trademark) and the second transmission channel 40 using the communication interface such as the network interface are used for connecting the information processing apparatus 100 and the television receiver 200.

A modified example thereof includes a configuration in which a single transmission channel, that is, a physically single transmission channel using the multimedia interface such as the HDMI (registered trademark), a communication interface, or another type of interface is used to transmit multimedia data such as image data and audio data and send/receive a request including at least control information and a response thereof.

The present technology can also take the following configurations.

(1) An information processing apparatus, including:

a data-sending interface capable of transmitting data to a television receiver through a first transmission channel;

a request-sending interface capable of sending a request to the television receiver through a second transmission channel; and a first control unit that detects an event and performs control to send, to the television receiver through the second transmission channel, a request including at least control information for giving an instruction about control to be executed by the television receiver in accordance with the detected event.

(2) The information processing apparatus according to (1), in which the first control unit is configured to detect a predetermined input from an input apparatus capable of receiving an input from a user as the event, perform control to transmit data associated with the event to the television receiver through the first transmission channel, and send, to the television receiver through the second transmission channel, a request including control information for giving an instruction to display the data together with data currently selected by input switching control at the television receiver.

(3) The information processing apparatus according to (1), in which the first control unit is configured to detect a predetermined input from an input apparatus capable of receiving an input from a user as the event and send, to the television receiver through the second transmission channel, data associated with the detected event and a request including control information for giving an instruction to display this data together with data currently selected by input switching control at the television receiver.

(4) The information processing apparatus according to (2) or (3), in which the data associated with the event is user interface information regarding an operation of the input apparatus.

(5) The information processing apparatus according to any of (1) to (4), in which the first control unit is configured to acquire time required for switching of a channel of the television broadcasting from the television apparatus through the second transmission channel, and send, to the television apparatus through the second transmission channel, a request including control information for giving an instruction to display a predetermined animation in a screen region, to which display of the television broadcasting is assigned, on a basis of the time while the channel switching is executed in a case of detecting an input for the channel switching from the input apparatus as the event when the data and the data currently selected by input switching control at the television receiver are displayed on the television apparatus.

(6) The information processing apparatus according to any of (1) to (3), in which data transmitted from the information processing apparatus to the television apparatus through the first transmission channel includes data of a game image, and the first control unit is configured to send, to the television apparatus through the second transmission channel, a request including control information for giving an instruction to display a sub-screen at a position having least influence on play of the game, in a case where a predetermined input for displaying data of the television broadcasting in the sub-screen from the input apparatus is detected as the event when the game image from the information processing apparatus is displayed on the television apparatus by input switching control at the television receiver.

(7) The information processing apparatus according to any of (1) to (3), in which the first control unit is configured to detect a predetermined first state of the information processing apparatus as the event and send, to the television receiver through the second transmission channel, data associated with the detected event and a request including control information for giving an instruction to display this data together with data currently selected by input switching control at the television receiver.

(8) The information processing apparatus according to any of (1) to (3), in which the first control unit is configured to detect a predetermined second state of the information processing apparatus as the event and send, to the television receiver through the second transmission channel, a request including control information for giving an instruction to change a display size of data currently selected by input switching control at the television receiver on a basis of this detection result.

(9) The information processing apparatus according to any of (1) to (3), in which
the first control unit is configured to
detect a predetermined second state of the information processing apparatus as the event and send, to the television receiver through the second transmission channel, a request including control information for giving an instruction to change sound volume of data currently selected by input switching control at the television receiver on a basis of this detection result.

(10) The information processing apparatus according to any of (1) to (3), in which
the first control unit is configured to
detect a predetermined third state of the television apparatus as the event and send, to the television receiver through the second transmission channel, a request including control information for giving an instruction to change a display size of data currently selected by input switching control at the television receiver on a basis of this detection result.

(11) The information processing apparatus according to any of (1) to (3), in which the first control unit is configured to detect a predetermined third state of the television apparatus as the event and send, to the television receiver through the second transmission channel, a request including control information for giving an instruction to change sound volume of data currently selected by input switching control at the television receiver on a basis of this detection result.

In addition, the following configurations can also be employed.

(12) An information processing apparatus, including:
an interface capable of transmitting data to a television receiver through a transmission channel and capable of sending a request to the television receiver through the transmission channel; and
a first control unit that detects an event and performs control to send, to the television receiver through the transmission channel, a request including at least control information for giving an instruction about control to be executed by the television receiver in accordance with the detected event.

(13) The information processing apparatus according to (12), in which
the first control unit is configured to
detect a predetermined input from an input apparatus capable of receiving an input from a user as the event, perform control to transmit data associated with the event to the television receiver through the transmission channel, and send, to the television receiver through the transmission channel, a request including control information for giving an instruction to display the data together with data currently selected by input switching control at the television receiver.

(14) The information processing apparatus according to (12), in which
the first control unit is configured to
detect a predetermined input from an input apparatus capable of receiving an input from a user as an event and send, to the television receiver through the transmission channel, data associated with the detected event and a request including control information for giving an instruction to display this data together with data currently selected by input switching control at the television receiver.

(15) The information processing apparatus according to (13) or (14), in which
the data associated with the event is user interface information regarding an operation of the input apparatus.

(16) The information processing apparatus according to any of (12) to (15), in which
the first control unit is configured to
acquire time required for switching of a channel of the television broadcasting from the television apparatus through the transmission channel, and
send, to the television apparatus through the transmission channel, a request including control information for giving an instruction to display a predetermined animation in a screen region, to which display of the television broadcasting is assigned, on a basis of the time while the channel switching is executed in a case of detecting an input for the channel switching from the input apparatus as the event when the data and the data currently selected by input switching control at the television receiver are displayed on the television apparatus.

(17) The information processing apparatus according to any of (12) to (15), in which
data transmitted from the information processing apparatus to the television apparatus through the transmission channel includes data of a game image, and
the first control unit is configured to
send, to the television apparatus through the transmission channel, a request including control information for giving an instruction to display a sub-screen at a position having least influence on play of the game, in a case where a predetermined input for displaying data of the television broadcasting in the sub-screen from the input apparatus is detected as the event when the game image from the information processing apparatus is displayed on the television apparatus by input switching control at the television receiver.

(18) The information processing apparatus according to any of (12) to (15), in which
the first control unit is configured to
detect a predetermined first state of the information processing apparatus as the event and send, to the television receiver through the transmission channel, data associated with the detected event and a request including control information for giving an instruction to display this data together with data currently selected by input switching control at the television receiver.

(19) The information processing apparatus according to any of (12) to (15), in which
the first control unit is configured to
detect a predetermined second state of the information processing apparatus as an event and send, to the television receiver through the transmission channel, a request including control information for giving an instruction to change a display size of data currently selected by input switching control at the television receiver on a basis of this detection result.

(20) The information processing apparatus according to any of (12) to (15), in which
the first control unit is configured to
detect a predetermined second state of the information processing apparatus as an event and send, to the television receiver through the transmission channel, a request including control information for giving an instruction to change sound volume of data currently selected by input switching control at the television receiver on a basis of this detection result.

(21) The information processing apparatus according to any of (12) to (15), in which
the first control unit is configured to
detect a predetermined third state of the television apparatus as an event and send, to the television receiver through the transmission channel, a request including control information for giving an instruction to change a display size of data currently selected by input switching control at the television receiver on a basis of this detection result.

(22) The information processing apparatus according to any of (12) to (15), in which
the first control unit is configured to
detect a predetermined third state of the television apparatus as an event and send, to the television receiver through the transmission channel, a request including control information for giving an instruction to change sound volume of data currently selected by input switching control at the television receiver on a basis of this detection result.

(23) A television receiver, including:
an interface corresponding to an interface of an information processing apparatus including
the interface capable of transmitting data through a transmission channel and capable of sending a request through the transmission channel, and
a first control unit that detects an event and performs control to send, to the television receiver through the transmission channel, a request including at least control information for giving an instruction about control to be executed by the television receiver in accordance with the detected event; and
a second control unit that performs internal control of the television receiver in accordance with the control information included in the received request.

(24) A program that executes a computer to operate as
a first control unit that transmits data to a television receiver through a transmission channel and performs, when detecting an event, control to send, to the television receiver through the transmission channel, a request including at least control information for giving an instruction about control to be executed by the television receiver in accordance with the detected event.

(25) An information processing system, including:
an information processing apparatus; and
a television receiver, in which
the information processing apparatus includes
an interface capable of transmitting data to the television receiver through a transmission channel and capable of sending a request to the television receiver through the transmission channel, and
a first control unit that detects an event and performs control to send, to the television receiver through the transmission channel, a request including at least control information for giving an instruction about control to be executed by the television receiver in accordance with the detected event, and
the television receiver includes
an interface corresponding to the interface of the information processing apparatus, and
a second control unit that performs internal control of the television receiver in accordance with the control information included in the received request.

REFERENCE SIGNS LIST 20 controller
30 first transmission channel
40 second transmission channel
70 TV remote controller
100 information processing apparatus
101 CPU
105 data-sending interface
107 request-sending interface
200 television receiver
201 CPU
205 broadcasting reception unit
206 data-receiving interface
207 request-receiving interface
210 display unit

The invention claimed is:
1. An information processing apparatus, comprising:
a data-sending interface capable of transmitting data to a television receiver through a first transmission channel;
a request-sending interface capable of sending a request to the television receiver through a second transmission channel; and
a first control unit that detects an event and performs control to send, to the television receiver through the second transmission channel, a request including at least control information for giving an instruction about control to be executed by the television receiver in accordance with the detected event,
wherein the first control unit is configured to detect a predetermined input from an input apparatus capable of receiving an input from a user as the event and send, to the television receiver through the second transmission channel, data associated with the detected event and a request including control information for giving an instruction to display this data together with data currently selected by input switching control at the television receiver,
wherein the data associated with the event is user interface information regarding an operation of the input apparatus, and
wherein
the first control unit is configured to
acquire time required for switching of a channel of television broadcasting from the television receiver through the second transmission channel, and
send, to the television receiver through the second transmission channel, a request including control information for giving an instruction to display a predetermined animation in a screen region, to which display of the television broadcasting is assigned, on a basis of the time while the channel switching is executed in a case of detecting an input for the channel switching from the input apparatus as the event when the data and the data currently selected by input switching control at the television receiver are displayed on the television receiver.

2. A television receiver, comprising:
a data-receiving interface corresponding to a data-sending interface of an information processing apparatus including
the data-sending interface capable of transmitting data through a first transmission channel,
a request-sending interface capable of sending a request through a second transmission channel, and
a first control unit that detects an event and performs control to send, to the television receiver through the second transmission channel, a request including at least control information for giving an instruction about control to be executed by the television receiver in accordance with the detected event;

a request-receiving interface corresponding to the request-sending interface of the information processing apparatus; and a second control unit that performs internal control of the television receiver in accordance with the control information included in the received request, wherein the first control unit is configured to detect a predetermined input from an input apparatus capable of receiving an input from a user as the event and send, to the television receiver through the second transmission channel, data associated with the detected event and a request including control information for giving an instruction to display this data together with data currently selected by input switching control at the television receiver, wherein the data associated with the event is user interface information regarding an operation of the input apparatus, and wherein the first control unit is configured to acquire time required for switching of a channel of television broadcasting from the television receiver through the second transmission channel, and send, to the television receiver through the second transmission channel, a request including control information for giving an instruction to display a predetermined animation in a screen region, to which display of the television broadcasting is assigned, on a basis of the time while the channel switching is executed in a case of detecting an input for the channel switching from the input apparatus as the event when the data and the data currently selected by input switching control at the television receiver are displayed on the television receiver.

* * * * *